J. H. BRINTON.
Fertilizer.
No. 35,920. Patented July 22, 1862.
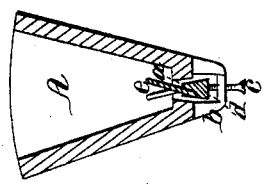
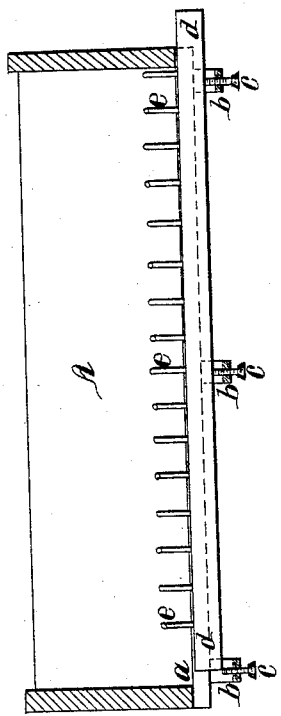
Witnesses.
Harry W Price
John Mathys
Inventor.
Joseph H Brinton
By Atty A B Houghton

UNITED STATES PATENT OFFICE.

JOSEPH H. BRINTON, OF WEST CHESTER, PENNSYLVANIA.

IMPROVEMENT IN HOPPERS OF MACHINES FOR SOWING GRAIN, &c., BROADCAST.

Specification forming part of Letters Patent No. 35,920, dated July 22, 1862.

*To all whom it may concern:*

Be it known that I, JOSEPH H. BRINTON, of West Chester, in the county of Chester and State of Pennsylvania, have invented certain new and useful Improvements in the Construction and Operation of the Hoppers of Machines for Sowing Grain or Manures Broadcast; and I do hereby declare the following to be a full, clear, and exact description of the same, reference being had to the accompanying drawings, making a part of this specification, in which—

Figure 1 represents a longitudinal vertical section, and Fig. 2 represents a transverse vertical section, through the hopper and the seeding or distributing bar that is vibrated through or under it.

My invention consists in supporting and vibrating the distributing-bar in and upon adjustable bearings underneath the hopper, so that the contents of the hopper shall not bear upon said vibrating bar, and so that the opening through the bottom of the hopper may be opened or closed, as may be required, for the particular kind of material that is to be dropped from it in regulated quantities by said bar, there being spuds upon the bar that project up into the hopper to prevent the material therein from becoming clogged or choked.

To enable others skilled in the art to make and use my invention, I will proceed to describe the same with reference to the drawings.

A represents a hopper of any of the ordinary forms used in sowing grain or manures, having in its bottom a longitudinal wedge-shaped opening, $a$. Underneath the hopper there are placed bearers $b\ b\ b$, through which, from their under sides, project upward set-screws $c\ c\ c$. The seeding or distributing bar $d$ is made wedge-shaped to correspond with the opening in the bottom of the hopper, so that when it is run up into said opening it may close it entirely against any egress of the contents of the hopper. In the upper edge of the bar $d$ there are arranged a series of inclined or vertical spuds, $e$, that loosen up the contents of the hopper and prevent it from clogging therein. These spuds may be screwed into the vibrating bar $d$, so that they may be adjusted to extend farther into the hopper or its contents, or a less distance, as the nature of the material may require. The bar $d$ may be vibrated in any of the common well-known ways of operating seeding-bars, and the hopper may be mounted upon wheels or runners to transport it over the fields in any of the usual ways. When the machine is distributing its contents broadcast the bar $d$ is let down and rests and reciprocates upon the points of the set-screws, and not upon the hopper-bottom, as is usual in most machines for this purpose, and by lowering or raising the set-screws a greater or less quantity of the seed or manures will be dropped through the openings between the sides of the bar and the sides of the opening through the hopper-bottom, which are thus increased or diminished in area.

Having thus fully described the nature and object of my invention, what I claim therein as new, and desire to secure by Letters Patent, is—

In combination with the wedge-shaped opening through the hopper-bottom, the wedge-shaped vibrating bar $d$, when said bar is supported upon adjusting devices below the hopper and is furnished with spuds which extend up into the hopper, substantially in the manner and for the purpose set forth.

JOSEPH H. BRINTON.

Witnesses:
WM. WHITEHEAD,
DAVID M. MCFARLAND.